United States Patent

[11] 3,530,799

[72] Inventor Emil Braun
Dortmund-Kirchlinde, Germany
[21] Appl. No. 758,977
[22] Filed Sept. 11, 1968
[45] Patented Sept. 29, 1970
[73] Assignee Orenstein & Koppel Aktiengesellschaft
Berlin, Germany
[32] Priority Sept. 14, 1967
[33] Germany
[31] No. 1,580,899

[54] GUIDING ARRANGEMENT FOR PLATFORM CARRIAGES FOR PASSENGER CONVEYOR INSTALLATIONS
3 Claims, 5 Drawing Figs.

[52] U.S. Cl. .................................................. 104/25
[51] Int. Cl. .................................................. A63g 1/00
[50] Field of Search ........................................ 104/25, 20; 198/16—18, 189, 95

[56] References Cited
UNITED STATES PATENTS
| | | | |
|---|---|---|---|
| 2,085,076 | 6/1937 | Dunlap | 198/16 |
| 3,395,648 | 8/1968 | Karr | 104/25 |

Primary Examiner—Richard E. Aegerter
Attorney—Walter Becker

ABSTRACT: Guiding mechanism for passenger transport systems having platforms serially arranged in an operating path between a pair of endless tow chains. Each platform is conveyed along opposite drive chain strands on roller shafts that are journaled to the platform. Adjustable partially rounded discs and chain mounted mushroom-shaped guiding means provide pivotally journaled axis-parallel platform positioning that is maintained thereby with the shafts between the chains.

Patented Sept. 29, 1970 3,530,799

INVENTOR
Emil Braun
By

GUIDING ARRANGEMENT FOR PLATFORM CARRIAGES FOR PASSENGER CONVEYOR INSTALLATIONS

The present invention relates to a guiding arrangement for platform carriages for passenger conveyor installations in which the platform carriages are arranged one behind the other in driving direction and are taken along by means of two endless chains, said carriages being laterally connected to the chain strands.

With heretofore known conveyor installations for the continuous transport of passengers, individual platform carriages equipped with rollers are arranged one adjacent to the other and together with an endless pair of chains arranged laterally of said carriages form the circulating belt, said carriages being connected to said pair of chains. With these arrangements the platform carriages are taken along by means of the shafts which interconnect the chains and to which the platform carriages are connected at two places.

Practical experience has shown that the connecting shafts are, as a rule, not precisely at a right angle to the conveying direction and consequently are not axis-parallel. The deviation from this axis-parallelity is caused by differences in the tolerances of the individual chain links and by a different lengthening of the chains of the two chain strands brought about by the stresses and the load so that with chains having a considerable length, material deviations from the axis-parallelity can occur. The thus caused inclined position of the shafts brings about an increased friction and thereby an increased power consumption and wear since in particular the grooves provided in the landing platform into which the platform carriages move are subjected to abrasion.

It is, therefore, an object of the present invention to provide an arrangement which without changing the basic construction will overcome the above mentioned drawbacks.

It is another object of this invention to provide an arrangement of the general character set forth above which will bring about that all grooves of succeeding platforms will be properly aligned in the moving direction of the conveyor installation.

These and other objects and advantages of the invention will appear more clearly from the following specification in connection with the accompanying drawings, in which.

The arrangement according to the present invention is characterized primarily in that the step-on platforms of the platform carriages have that end thereof which faces the connecting shaft, interconnecting the two chain strands and equipped with rollers, rotatably journaled on said connecting shaft by means of two semicircular discs.

According to a further development of the present invention, mushroom-shaped guiding members act against that end of the platform carriages which is remote from the respective connecting shaft, said guiding members being adjustably mounted on those chain links of the chain strands which are adjacent to the drag rollers.

The arrangement according to the present invention brings about that the platform carriages are guided rectilinearly, especially when they exceed the customary length, so that all grooves of succeeding platforms will be properly aligned in moving direction of the conveyor installation. In addition thereto, it will be assured that the platform carriages will at the transfer area from the conveyor belt to the fixed landing platform move precisely along the teeth of said landing platform.

It will also be assured that the individual platform carriages, even though the chain strands should have stretched unevenly, will be guided free from transverse forces. Thus, also the transverse gaps between the platform carriages, which gaps are necessary for a proper functioning of the installation, will be uniform and parallel over the width of the platform, and the danger of accidents caused by clamping-in between two platform carriages will be considerably reduced.

Figure 1:
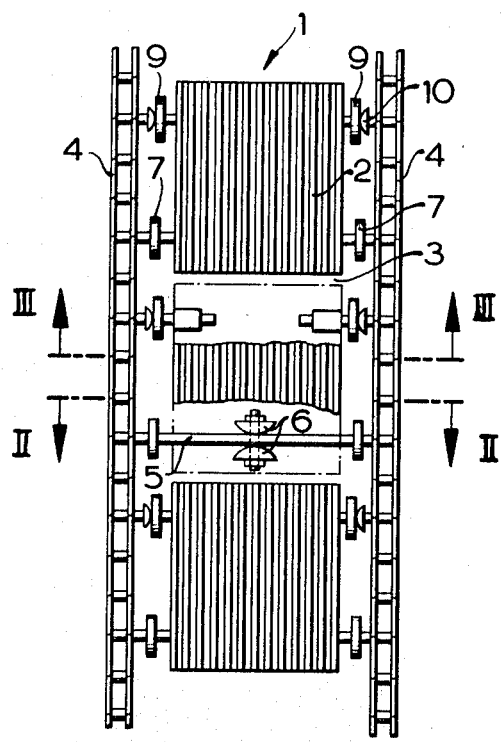
FIG. 1 is a diagrammatic top view of a portion of a passenger conveyor installation according to the invention.
Figure 2:
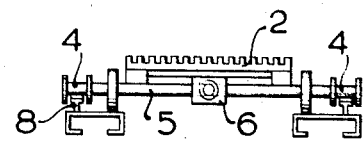
FIG. 2 represents a section through a platform carriage, said section being taken along the line II–II of FIG. 1.
Figure 2A:
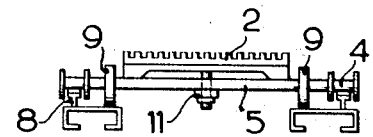
FIG. 2a is a section similar to that of FIG. 2 but with a modified platform on the connecting shaft.
Figure 3:
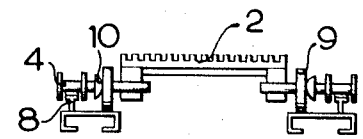
FIG. 3 is a section taken along the line III–III of FIG. 1.
Figure 4:
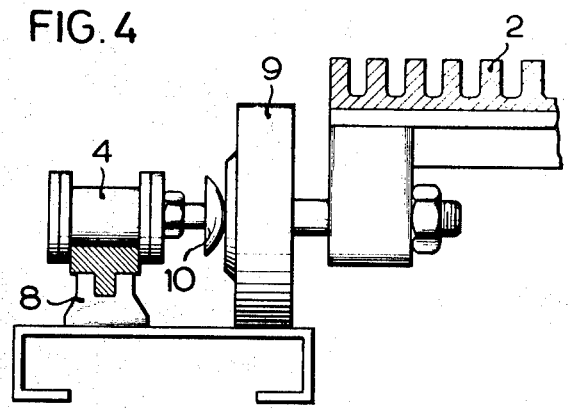
FIG. 4 is a cutout of a portion of FIG. 3 but on a considerably larger scale than the latter.

Referring now to the drawing in detail, the serially arranged plane platform carriages 1 are provided with grooved or fluted step-on platforms 2 and are separated from each other by narrow transverse gaps 3 only. At both sides of said platform carriages 1 there are provided endless chain strands 4 which at areas spaced from each other in conformity with the length of the platform carriages are connected to each other by connecting shafts 5. The platforms 2 are rotatably journaled on said connecting shafts 5 by means of a bracket comprising semi-circular discs 6 (FIG. 1). Running rollers 7 are respectively mounted on the connecting shaft 5 at both sides of the platform carriages 1 and directly adjacent to the chain strands 4. The chain strands 4 are by guiding means 8 secured against lateral displacement. Drag rollers 9 are respectively arranged on the outer ends of the connecting shafts 5 at each side of the respective platform carriage. The arrangement is such that the axes of said drag rollers 9 are at the level of the chain strands. As will be seen from FIG. 4, an adjustable mushroom-shaped guiding member 10 is arranged at the respective chain link adjacent and opposite to the shaft carrying the drag roller 9. This guiding member 10 may be so adjusted that the platform carriage 1 is guided at both sides. All platform carriages 1 will thus be precisely guided in longitudinal direction, namely on one hand by the connecting shafts 5 and on the other hand by the guiding members 10 on the chain guiding means 8. The above mentioned bracket formed by the discs 6 permits an adjustment of the transverse gaps between succeeding platform carriages. The rotatable mounting of the step-on platform 2 on the connecting shaft 5 may also be effected by means of a pivot 11 as shown in FIG. 2a.

As will be seen from the above, the arrangement according to the present invention brings about that each platform carriage will be pulled or pushed without any possibility of escaping toward the side.

It is, of course, to be understood that the present invention is not limited to the particular embodiments shown in the drawing but also comprises modifications, the invention being determined by the scope of the appended claims. Thus, while the invention has been described in connection with a conveyor installation over a plane path, the invention is equally well applicable to conveyor installations moving over an inclined path, as for instance escalators composed of individual conveyor elements in the form of steps.

I claim:

1. A guide mechanism for each of plural load carrying conveyor members between a pair of elements in a series operating path, comprising a pair of drag rollers journaled on opposite sides of each conveyor member, guide means that are carried by each of the elements in a direction toward adjacent drag rollers and that are pivotally in turning engagement with said drag rollers, a shaft that interconnects the pair of drive elements, and a drive connection between said shaft and the corresponding conveyor member.

2. The guide mechanism according to claim 1, wherein said guide means have mushroom-shaped ends in pivotal engagement with said drag rollers and are adjustable in position along each of the conveyor operating elements.

3. The guide mechanism according to claim 1, wherein said connection between said shaft and the corresponding conveyor member includes a pair of partially spherical discs adjustable longitudinally of the conveyor operating path, said guide means having laterally adjustable fastening to the drive elements.